United States Patent [19]

Komazawa et al.

[11] 4,390,684
[45] Jun. 28, 1983

[54] CONTINUOUS POLYMERIZATION METHOD

[75] Inventors: Hiroyasu Komazawa, Takarazuka; Tadashi Mori, Fujinomiya; Yukio Ikenaga, Fuji; Hiroshi Hotta, Fuji; Tuneyasu Nakashima, Fuji, all of Japan

[73] Assignee: Polyplastics Co., Ltd., Osaka, Japan

[21] Appl. No.: 292,073

[22] Filed: Aug. 12, 1981

[51] Int. Cl.³ .............................................. C08G 2/10
[52] U.S. Cl. .................................. 528/230; 528/241; 528/270
[58] Field of Search ........................ 528/230, 241, 270

[56] References Cited

U.S. PATENT DOCUMENTS

| | | |
|---|---|---|
| 3,253,818 | 5/1966 | Seddon et al. .................... 528/270 |
| 3,254,053 | 5/1966 | Fisher et al. ...................... 528/241 |
| 3,275,602 | 9/1966 | Weiss et al. ....................... 528/270 |
| 3,447,582 | 6/1969 | Street . | |
| 4,105,637 | 8/1978 | Semanchik et al. ............... 528/241 |
| 4,301,273 | 11/1981 | Sugio et al. . | |

Primary Examiner—Lucille M. Phynes
Attorney, Agent, or Firm—Maria C. H. Lin

[57] ABSTRACT

A continuous polymerization method to obtain polymer production in the form of fine particles from a liquid polymerization medium; the reaction being conducted in a polymerization reactor wherein mixing is effected by the action of a plurality of elliptical paddles mounted on each of dual rotating shafts, characterised in that the dual shafts are rotated in reverse directions to each other, and the paddles being enclosed by walls of the reactor with the inside surface of the walls closely defining the surface generated by the rotation of the ends of both sets of paddles; and with the ends of major axes of the elliptical paddles on one rotating shaft periodically approaching the ends of minor axes of the corresponding elliptical paddles on the other rotating shaft to effect a mixing action as well as a longitudinal shearing action across a notional interface between the two shafts. The method is particularly useful for the polymerization of trioxane.

3 Claims, 5 Drawing Figures (a)

(b)

(c)

(a)　　　　(b)　　　　(c)

CONTINUOUS POLYMERIZATION METHOD

This invention relates to a method of a continuous polymerization of a liquid polymerization medium to obtain fine particles of polymer product, the reaction being continuously effected in a polymerization reactor wherein mixing is effected by the action of a plurality of paddles mounted on each of dual rotating shafts.

The homo- or co-polymerization of molten trioxan is widely practised. Thus the production of polyoxymethylene (co-) polymer, is industrially very important in the production of polyacetal resin.

The present invention is particularly suitable to such continuous polymerization of trioxan, although it can be used for other processes wherein a phase change takes place and in which a desired granulating step is required.

When molten trioxan (if desired containing material comonomer for example one or more of the monomers ethylene oxide, dioxolan, butanediol, formal and diethylene glycol formal) is polymerized in the presence of a strong acid e.g. phosophorous pentafluoride or perchloric acid or tin chloride or boron trifluoride, to give for example poly-oxymethylene, the very rapid reaction rate changes the liquid phase of the polymerization medium into a solid phase through a short intermediate slurry phase.

If the reaction is effected without a comminuting step large blocks of stiff product will be obtained resulting in difficult handling, a deterioration in quality due to accumulated polymerization heat, and lowered polymerization yield. Reaction under a high shearing action is a particularly preferred technique for the prevention of large blocks of product and for providing effective removal of polymerization heat of which various detailed methods have been proposed. A reactor which is a mixer extruder having dual shafts supporting paddles is a useful apparatus because it imparts a high shearing action to the contents. For example published Japanese Patent specification No. 84890/76 discloses a dual shaft mixer comprising a combination of elliptical paddles. Such features have a disadvantage however when used for polymerization reactions in that the dual shafts all rotate in the same direction. The features of this system are the strong shearing action on the contents, a self-cleaning action, the ability to fully granulate the contents of a polymerizing apparatus, and paddles free from polymer adhering thereto. However such advantages are offset by the higher loads that are applied to the rotating shafts, and for safe operation the contents of the vessel must be restricted. For the solution of this problem published Japanese Patent specification No. 86794/78 discloses a method which restricts the degree of high shearing action to a lower value and provides a second reactor of lower shearing action. Such two-stage reaction techniques however restrict the conversion obtained to a specified range, and if it increases too much the load on the final vessel providing high shearing becomes too high, and if the conversion is too low the degree of filling of the second reactor increases so as to cause agglomeration of solid particles leading to a deterioration of quality. Thus the method according to the said Japanese Patent specification No. 86794/78 is limited in adaptability to change of material quality and product grade. It is therefore desirable to provide an optimum shearing action in the same reactor in accordance with the progress of reaction. While it is possible in dual shaft apparatuses using shafts rotating in the same direction to vary the shearing force by changing the pitch of the screws or by changing the clearance inside the apparatus, since the progress of the reaction depends upon slight changes of the reaction conditions and material quality, such apparatus is not readily adaptable. Thus there is a need for apparatus in which shearing action changes according to the progress of reaction.

Hitherto a paddle-type dual shaft mixer the shafts of which rotate in reverse directions to each other has not been considered as a polymerization apparatus because it effects only low shearing force and is not self-cleaning. However it has now been found that in such a mixer the shearing force automatically changes in the desirable direction corresponding to changes in phase occurring in liquid phase polymerization reactions.

The invention provides a method of continuous polymerization of a liquid polymerization medium to obtain fine particles of polymer product, the reaction being continuously effected in a polymerization reactor wherein mixing is effected by the action of a plurality of paddles mounted on each of dual rotating shafts, characterised in that the said dual shafts rotate in reverse directions to each other, and the said paddles are enclosed by walls of the said reactor the inside surface of the said walls closely defining the surface generated by the rotation of the ends of both sets of paddles; the ends of major axes of the said paddles on one rotating shaft periodically approaching the ends of minor axes of the corresponding paddles on the other rotating shaft to effect a mixing action as well as a longitudinal shearing action across a notional interface between said two shafts.

The method according to this invention can expeditiously be used for polymerization reactions in which a liquid-to-solid phase-change occurs, particularly for the continuous polymerization of trioxan.

This invention is hereinafter described and illustrated in the accompanying drawings, of which FIG. 1 is a schematic elevation of the mixer reactor 1 used in the method of the invention, the broken portion showing the position of the shafts;

Figures 1, 2:
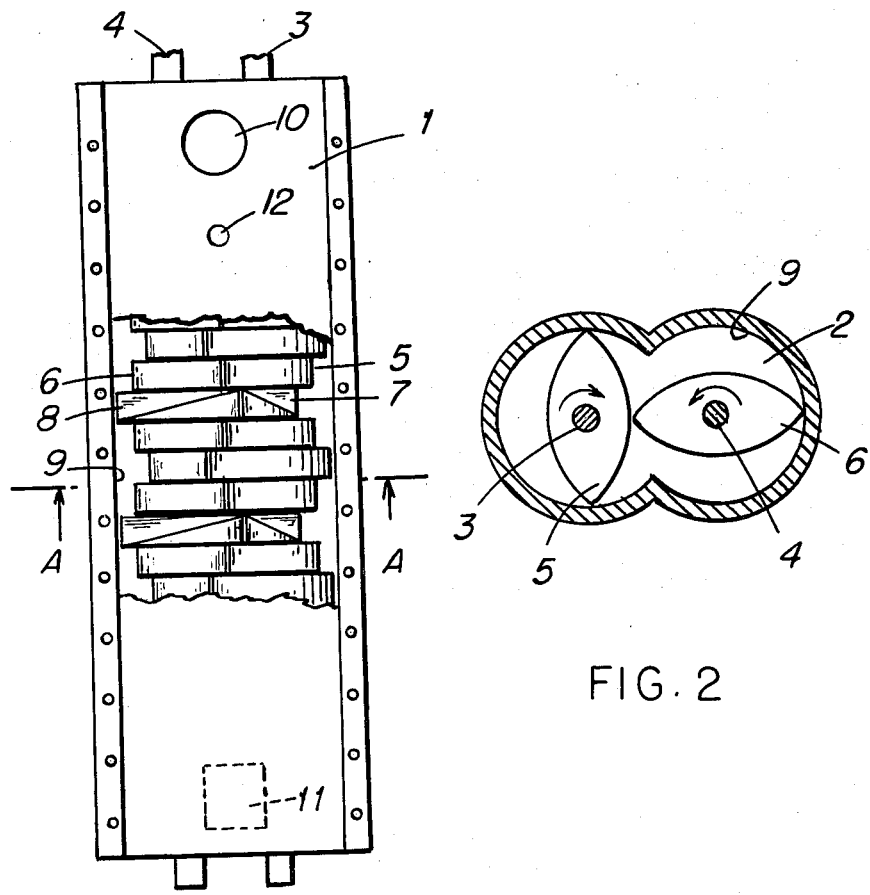
FIG. 2 is a cross-sectional view on line A—A in FIG. 1.
Figure 3:
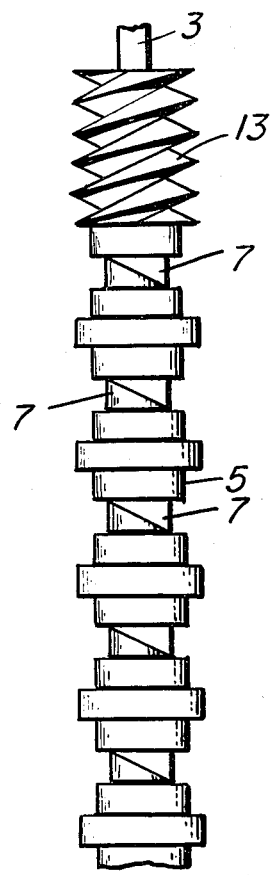
FIG. 3 is a partial elevation of a shaft of the mixer.

The mixer 1 includes a closed long narrow space 2 having a cross-section as shown in FIG. 2. The space 2 accommodates two shafts 3 and 4. On the first shaft 3 and second shaft 4 are mounted a plurality of paddles 5, 6, 7, 8, . . . in an arrangement whereby corresponding paddles on both the shafts engage with each other alternately. Successive paddles on the same shaft are displaced for example by 90° or 60°, to vary the mixing characteristics. Skewed feed paddles 7, 8 are also included in the paddles. Around the periphery of the paddles an enclosing wall 9 is provided with its inside surfaces in close contact with the paddles. The mixer 1 has an inlet port for charging the liquid polymerization medium and an outlet port 11 for discharging the solid product. The liquid medium e.g. troixan is charged from the charging port 10 into one end of the mixer reactor 1, and the catalyst is introduced through the catalyst inlet 12 and mixed with the liquid medium, and the solid product is discharged from the discharging port 11 provided at the other end. The position of the catalyst inlet 12 is not limited to the upper portion of the mixer, and the catalyst can be introduced from any direction. The catalyst can be charged also together with the starting material e.g. trioxan. As shown in FIG. 3 a feed screw 13 is positioned near the charging port and pushes forward the contents. The skewed feed paddles 7 arranged between the adjacent non-skewed paddles help to push the contents forward.

Figure 4:
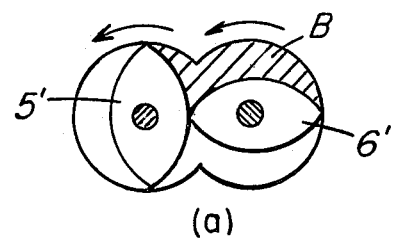
Figure 4:
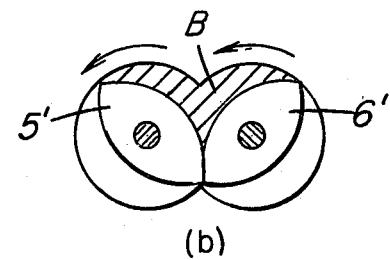
Figure 4:
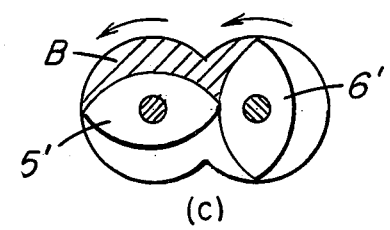
Figure 5:
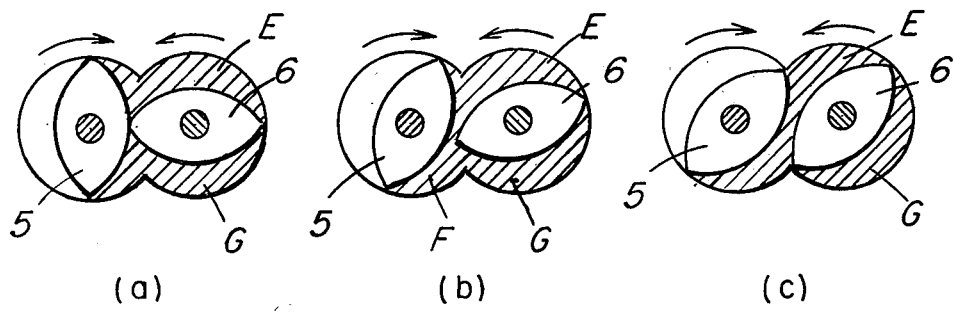

The relationship of the movements of paddles and contents when the dual shafts rotate in the same direction or in reverse directions is shown in FIG. 4 and FIG. 5. FIG. 4 shows the movement of the contents when the shafts rotate in the same direction, and FIG. 5, when the shafts rotate in reverse directions, the contents shown in hatched outline. In FIG. 4 the paddles rotate by 90° in the stages (a)→(b)→(c). With respect to the space (B) enclosed by the paddles 5′, 6′ and walls 9, the space volume, while undergoing some change, is merely moved from right to left. Thus, only a small mixing effect is obtained in this process, while the large resistance increases the load applied on the apparatus. In contrast to this in FIG. 5, which illustrates the invention, the space (E) in the stage (a) is decreased by compression when moving from stage (b) to (c), the space (G) being gradually expanded. Therefore the contents move in the arrowed direction (F) through the clearance between the paddles 5 and 6, and longitudinal mixing and adequate shearing are effected. There is thus a significant difference between polymerization processes using co-directional rotation of the shafts and by the reverse-directional rotation, as hereafter further described.

As set forth in published Japanese Patent specification No. 86794/78, the polymerization of trioxan is divided into three stages. In the first stage rapid reaction has not yet occurred or the reaction is less than 20% completed, the contents still being in liquid state. The requirements for the reactor mixer in this stage is merely a good mixing ability. In the second stage, reaction proceeds with a rapid phase change from liquid to solid. The reaction proceeds in the range from 20 to 60% completion. The required properties of the reactor mixer are strong shearing effects and good removal of heat. The third stage results in the formation of fine particles of solid (providing full shearing force has been applied in the preceding stage), the liquid not remaining as a continuous phase. Requirements for the reactor in this stage are slow agitation which is enough to prevent adhesion between solid particles, heat removal, and a retention time to allow for completion of the polymerization. Shearing effects are not required.

A feature of the dual shaft reactor described in the said Japanese Patent specification No. 84890/76 with elliptical paddles rotating in the same direction, which had been considered best before the advent of the present invention, is such that two corresponding paddles rotate always in contact with each other (with self-cleaning effect) and rotate the space defined by the paddles and the walls of the mixer, while changing its volume and shape to effect substantial deformation of the contents. This feature has favourable effect in the first stage of reaction, but the effect arising from the fact that the paddles are always in contact with each other, is amall because of the low viscosity of the contents at this stage. These features are favourable also in the second stage where a strong shearing force is required; a reason why the same directional rotation system has been considered desirable. In the third stage, the contents are in substantially the form of solid particles, the volume of which and the interstitial spaces are difficult to change. If such contents are forced to change volume and form, they show a strong resistance and impose a very high load, and therefore the apparatus should be operated at a lower degree of filling. However a low filling degree leads to sinking of solid particles and uneven force exerted on the shafts resulting in bent shafts and increased load. Thus the operative range is extremely limited. To increase the retention time, in addition, the length/diameter ratio must be increased, which will further increase shipping of the rotating shafts.

In contrast, in the dual shaft reactor with paddles rotating in reverse directions used according to this invention, though coupled elliptical paddles contact at the end of the major axis of a paddle with the end of the minor axis of the other paddle, other parts of the paddles do not contact each other on rotation. Thus the reactor is not self-cleaning in the usual sense. In the first stage of reaction, the problem of mixing low viscosity liquids has little correspondence with the direction of rotation, and the apparatus of this invention has a similar function to the same direction rotation apparatus.

In the second stage of reaction high shearing force is required, and the reverse directional rotation apparatus, which is not a self-cleaning type, at first sight appears to be disadvantageous with weak shearing force. In fact however the contents at this stage, having a strong tendency to stick to each other, hardly move from the clearance between the paddles, and good shearing action is effected by the reverse directional rotation apparatus, like the same directional rotation apparatus. The clearance between paddles has little significance. In the third stage wherein solid particles have relatively weak adhesion, the clearance between paddles is of significance in that it allows the particles to move into another space through it. Therefore the resistance and load are kept lower even at higher filling degrees. In addition, since the paddle surface is always rubbed by solid particles, undesirable sticking of polymer hardly occurs in spite of the paddles not being self-cleaning. Thus the reverse directional rotation apparatus has such characteristics that the exertion of the shearing force, that is the load on the apparatus, automatically changes in a desirable direction as the reaction stage proceeds, namely according to the phase change of the contents.

For the above reasons, the same directional rotation reactor and reverse directional rotation reactor cannot be operated under the same conditions. In the conditions that attain enough filling and keep sufficient retention time for the reverse directional rotation reactor, the same directional rotation reactor cannot operate because of greatly raised resistance of the solid filling and the maximum filling degree in the operative range for the same directional rotation reactor is half that for the reverse directional reactor. Even in this range however the shafts of the same directional rotation reactor can be bent during agitation. Because of this whipping effect the clearance between the paddles and the barrel must be made large enough to prevent their contact. This results in a thick layer on the barrel walls leading to poor heat removal and lowered product quality. The operation at lower filling degree extends retention time and also causes lowered quality.

In the reverse directional rotation apparatus used in the method of this invention, the automatic change of characteristics in the same reactor fully responds to the change of reaction rate due to the change of reaction conditions, material quality and grade. Thus the reactor used according to this invention permits reaction at a rate from zero to nearly 100% and can be used also as the primary or secondary reactor in a two-stage reaction method.

This invention will be further described with reference to the examples.

EXAMPLE 1

One hundred parts by weight of trioxan, 2.5 parts by weight of ethylene oxide, and 100 ppm boron trifluoride were charged into a reactor shown in FIG. 1. Water at 25° C. was passed through the jacket. The shafts were rotated in reverse directions at 45 rpm. After a residence time of about 8 min. a finely powdered product was obtained from the discharge port. Unreacted monomer content in the product was about 2%.

EXAMPLE 2

Materials of the same composition as Example 1 were reacted in the apparatus shown in FIG. 1, with a residence time of 2 min. The conversion at the discharge port was 60%. This reactant was further fed into an agitator having paddles inside a cylinder which was water-cooled and agitated for 10 min. The unreacted monomer content in the product taken out of the agitator was 2%.

COMPARATIVE EXPERIMENT

Similar polymerization was tried in the same reactor as in Example 1, with the shafts rotated in the same direction. Upon the start of polymerization, the load on the apparatus increased substantially and the shafts whipped so much that the paddles contacted the barrel and stopped the motor. Thus the experiment could not be continued.

We claim:

1. A method of continuous polymerization of a liquid polymerization medium to obtain fine particles of polymer product by conducting the reaction in a polymerization reactor wherein mixing is effected by the action of a plurality of elliptical paddles mounted on each of dual rotating shafts, characterised in that the shafts are rotated in reverse directions to each other, and the paddles are enclosed by walls of the reactor with the inside surface of major axes of the elliptical paddles on one rotating shaft periodically approaching the ends of the minor axes of the corresponding elliptical paddles on the other rotating shaft to effect a mixing action as well as a longitudinal shearing action across a notional interface between said two shafts.

2. A method according to claim 1 for the continuous polymerization of trioxane.

3. A method according to claim 1 for the continuous polymerization of trioxane with a comonomer selected from a group comprising ethylene oxide, dioxolane, butanediol, formal and diethylene glycol formal.

* * * * *